US012375323B2

(12) United States Patent
Sarr et al.

(10) Patent No.: US 12,375,323 B2
(45) Date of Patent: Jul. 29, 2025

(54) TRANSMITTER AND RECEIVER MODULE, COMMUNICATION SYSTEM FOR EXCHANGING ETHERNET FRAMES ON A SINGLE M-LVDS LINE

(71) Applicant: Schneider Electric Industries SAS, Rueil Malmaison (FR)

(72) Inventors: Assane Sarr, Villeneuve Loubet (FR); Maxime Sobocinski, Cagnes sur Mer (FR); Patrice Jaraudias, Le Cannet (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 87 days.

(21) Appl. No.: 18/095,696

(22) Filed: Jan. 11, 2023

(65) Prior Publication Data

US 2023/0239180 A1 Jul. 27, 2023

(30) Foreign Application Priority Data

Jan. 25, 2022 (EP) .................................. 22305077

(51) Int. Cl.
*H04L 25/02* (2006.01)
*H04L 25/49* (2006.01)

(52) U.S. Cl.
CPC ...... *H04L 25/0272* (2013.01); *H04L 25/4908* (2013.01)

(58) Field of Classification Search
CPC ............. H04L 25/0264; H04L 25/0272; H04L 25/4908; H04L 25/491

(Continued)

(56) References Cited

U.S. PATENT DOCUMENTS

2008/0267314 A1* 10/2008 Bar-Sade ............ H04L 63/0428
375/272
2012/0300792 A1* 11/2012 Patel ...................... H04L 49/30
370/476

(Continued)

FOREIGN PATENT DOCUMENTS

CN 203143955 U 8/2013
CN 105573239 A 5/2016

OTHER PUBLICATIONS

European Search Report and Search Opinion dated Jul. 19, 2022 for corresponding European Patent Application No. EP22305077.4, 4 pages.

*Primary Examiner* — Young T. Tse
(74) *Attorney, Agent, or Firm* — Troutman Pepper Locke LLP (57) ABSTRACT

A transmitter module, a receiver module and a communication system for exchanging Ethernet Medium Access Control (MAC) frames on a single Multipoint Low Voltage Differential Signaling (M-LVDS) line. The transmitter module includes: a first transmitter media-independent interface (MII) including parallel data lines for receiving bits of an Ethernet MAC frame to be transmitted on the single M-LVDS line: an 8b/10b encoding unit adapted to encode 8-bit words to produce 10-bit words, wherein the 8-bit words include bits of the Ethernet MAC frame received on the parallel data lines of the first transmitter MII; a serializing unit adapted to serialize the 10-bits words; and an M-LVDS transmitter unit for transmitting the serialized 10-bit words on the single M-LVDS line.

15 Claims, 4 Drawing Sheets

(58) Field of Classification Search
USPC .............. 375/242, 244, 254, 257; 340/12.31,
340/12.32, 13.23; 341/56, 84, 85,
341/100–103
See application file for complete search history.

(56) References Cited

U.S. PATENT DOCUMENTS

| | | | |
|---|---|---|---|
| 2013/0101058 A1* | 4/2013 | Hummel | H04J 3/047 375/259 |
| 2015/0171892 A1* | 6/2015 | Yu | H04L 25/4908 370/254 |
| 2021/0152451 A1 | 5/2021 | Wang et al. | |

* cited by examiner

TRANSMITTER AND RECEIVER MODULE, COMMUNICATION SYSTEM FOR EXCHANGING ETHERNET FRAMES ON A SINGLE M-LVDS LINE

FIELD OF THE INVENTION

The present disclosure invention relates to a transmitter module and to a receiver module adapted for exchanging Ethernet frames on a single Multipoint Low Voltage Differential Signaling, M-LVDS, line. The present disclosure finds an advantageous but in no way limiting application for exchanging Ethernet frames between programmable logic controllers, PLCs.

BACKGROUND

In industrial networks, PLCs exchange data which may be used to control the behavior of said PLCs. Usually, in such industrial networks, the PLCs are connected using a daisy chain topology.

In a daisy chain topology, the PLCs are connected in sequence. The transmission of a frame from a transmitting PLC to a recipient PLC requires that each PLC located between the transmitting PLC and the recipient PLC in the daisy chain topology forwards the frame received from an upstream PLC to a downstream PLC, until the frame is received by the recipient PCL. Although a daisy chain topology is advantageous in that it is cost effective and robust, an industrial network having an important number of PLCs and using a daisy chain topology can have a non-negligeable latency which might not be compatible with the near real-time constraints which usually apply to such PLCs. Also, using a daisy chain topology does not allow to easily remove or add a PLC.

A solution to overcome the above issues could be using Multipoint Low Voltage Signaling (M-LVDS) lines connecting several PLCs. When a PLC transmits data on a M-LVDS line, it can be simultaneously received by all the other PLCs connected to the M-LVDS line, thereby reducing latency. However, such industrial networks usually exchange Ethernet Medium Access Control, MAC, frames which, when using a standard media-independent interface, MII, requires at least 7 M-LVDS lines to carry the MII transmitter signals, or at least 11 M-LVDS lines in the case of gigabit MII (GMII). Having a large number of M-LVDS lines increases the complexity and the power consumption of the PLCs, and also increases the required space for an Ethernet M-LVDS backplane solution.

The present invention aims at mitigating these issues.

SUMMARY

An object of the present disclosure is therefore to propose a transmitter module for transmitting Ethernet medium access control, MAC, frames on a single Multipoint Low Voltage Differential Signaling, M-LVDS, line, said transmitter module comprising:
- a first transmitter media-independent interface, MII, comprising parallel data lines for receiving bits of an Ethernet MAC frame to be transmitted on the single M-LVDS line,
- a 8b/10b encoding unit adapted to encode 8-bit words to produce 10-bit words, wherein the 8-bit words comprises bits of the Ethernet MAC frame received on the parallel data lines of the first transmitter MII,
- a serializing unit adapted to serialize the 10-bits words,
- a M-LVDS transmitter unit for transmitting the serialized 10-bit words on the single M-LVDS line.

A transmitter module according to the present disclosure is therefore adapted to transmit the data received from the data lines and the clock signal received from a clock line of the MII on a single M-LVDS line, i.e. on a single pair of electric wires carrying the differential M-LVDS signals. Hence, a transmitter module according to the present disclosure reduces the power consumption, the space, the cost and the complexity required for transmitting an Ethernet MAC frame using a M-LVDS technology.

Optionally, the transmitter module further comprises a transmitter finite state machine, FSM, for sequentially providing 8-bit words of the Ethernet MAC frame to the 8b/10b encoding unit, the transmitter FSM reading the bits of the Ethernet MAC frame received by the parallel data lines and forming 8-bit words.

Optionally, the transmitter FSM is configured to add 8-bit M-LVDS preamble words to the Ethernet MAC frame and wherein the 8-bit M-LVDS preamble words comprises a clock synchronization word for recovering a clock of the transmitter module and a time synchronization word for recovering a beginning of a word of the transmitted frame. Here, the transmitted frame (M-LVDS frame hereinafter) should be understood as a frame comprising the Ethernet MAC frame and M-LVDS words allowing such Ethernet MAC frame to be transmitted and recovered on the single M-LVDS line. Such option allows a receiver module to recover the clock of the transmitter module and the beginning of a word of the M-LVDS frame.

Optionally, the 8-bit M-LVDS preamble words comprises a line word for setting the electrical level of the single M-LVDS line to a predetermined level. Such option allows stabilizing the electrical level of the line before transmitting the Ethernet MAC frame.

Optionally, the transmitter FSM is configured to replace the first word of an Ethernet MAC preamble of the Ethernet MAC frame by a word indicating the beginning of the Ethernet MAC frame. Such option allows a receiver module to recover the beginning of the Ethernet MAC frame.

Optionally, the transmitter module further comprises a second transmitter MII comprising parallel data lines for receiving bits of another Ethernet MAC frame to be transmitted on the M-LVDS line, and an arbiter adapted to choose which one of Ethernet MAC frames transmitted by the first or by the second transmitter MII will be transmitted on the M-LVDS line. Such option allows transmitting Ethernet MAC frames received from different types of transmitter MII using a single M-LVDS line.

Optionally, the first transmitter MII corresponds to a standard MII comprising four data lines and the second transmitter MII corresponds to a gigabit MII, GMII, comprising seven data lines. Such option allows transmitting Ethernet MAC frames received using a standard MII or a GMII, i.e. at different data rates using a single M-LVDS line.

Another object of the present disclosure proposes a receiver module for receiving Ethernet Medium Access Control, MAC, frames on a single Multipoint Low Voltage Differential Signaling, M-LVDS, line, said receiver module comprising:
- an M-LVDS receiver unit for receiving a serial bitstream on the single M-LVDS line, wherein the serial bitstream comprises 10-bit words of an 8b/10b encoding scheme,
- a clock data recovery, CDR, unit adapted to recover a clock from the serial bitstream received by the M-LVDS receiver unit and to extract the bits from the serial bitstream based on the recovered clock, a deserializing unit adapted to deserialize the extracted bits to form 10-bit words, an 8b/10b decoding unit adapted to decode 10-bit words to produce 8-bit words, a receiver media-independent interface, MII, comprising parallel data lines for outputting bits of an Ethernet MAC frame received on the single M-LVDS line, wherein the bits of the Ethernet MAC frame correspond to bits of the 8-bit words produced by the 8b/10b decoding unit.

A receiver module according to the present disclosure is therefore adapted to receive Ethernet MAC frames on a single M-LVDS line, i.e. on a single pair of electric wires carrying the differential M-LVDS signals. Hence, a transmitter module according to the present disclosure reduces the power consumption, the space, the cost and the complexity required for recovering an Ethernet MAC frame using a M-LVDS technology.

Optionally, the CDR unit is adapted to oversample the serial bitstream for recovering the clock of said serial bitstream, and the CDR unit comprises a CDR memory comprising at least two bits of storage and being adapted to store the bits extracted from the serial bitstream. Such option allows compensating a few physical differences between a transmitter clock of a transmitter module and a clock of the receiver module.

Optionally, the deserializing unit is adapted to detect a 10-bit word corresponding to a synchronization word and to transmit 10-bit words following said synchronization word to the 8b/10b decoding unit. Such option allows detecting a beginning of the 10-bit words in the M-LVDS frame transmitted by a transmitter module.

Optionally, the 8b/10b decoding unit comprises a decoding table for matching 10-bit words to 8-bit words and the 8b/10b decoding unit is adapted to detect an error based on the 10-bit words. Such option allows detecting an error on the received M-LVDS frame based on the 10-bit words.

Optionally, an error is detected by the decoding unit when a 10-bit word is not associated to a 8-bit word in the decoding table or when a predetermined plurality of successive bits belonging to two successive 10-bit words corresponds to a same value. Such option allows detecting an error on the received M-LVDS frame when:

there is no association between a 10-bit word of the M-LVDS frame and a 8-bit word of the decoding table, or there is a predetermined plurality of successive bits belonging to two successive 10-bit words which corresponds to a same value.

Optionally, a receiver finite state machine, wherein the receiver FSM is adapted to determine an error based on successive 8-bit words. Such option allows a receiver FSM to determine an error based on the decoded frame, for example by determining that successive 8-bit words of the decoded frame does not correspond to the expected format.

Optionally, the 8b/10b decoding unit and the receiver FSM are adapted to send an error signal to the deserializing unit. Such option allows both 8b/10b decoding unit and receiver FSM to send an error signal to the deserializing unit, for example when the 8b/10b decoding unit or the receiver FSM detects an error.

Another object of the present disclosure proposes a communication system for exchanging Ethernet Medium Access Control, MAC frames between a plurality of communicating devices connected to a same single Multipoint Low Voltage Differential Signaling, M-LVDS, line, wherein:

at least one communicating device comprises a transmitter module according to the present disclosure, connected to the single M-LVDS line, at least one communicating device comprises a receiver module according to the present disclosure, connected to the single M-LVDS line.

A communication system according to the present disclosure therefore allows communicating devices to exchange Ethernet MAC frames using a single M-LVDS line. Hence, a communication system according to the present disclosure reduces the power consumption of the different communicating devices 10 while reducing the space, the cost and the complexity of the communication system by removing M-LVDS lines

DETAILED DESCRIPTION

The disclosure applies to a transmitter module 2, to a receiver module 3 and to a communication system 1 for exchanging Ethernet Medium Access Control, MAC, frames between a plurality of communicating devices 10 connected to a same Multipoint Low Voltage Differential Signaling, M-LVDS, line 4.

The communication system 1 can be a multipoint communication system, that is, a communication system on which several transmitter modules 2 and several receivers can be connected.

Example of Communication System

Figure 1:
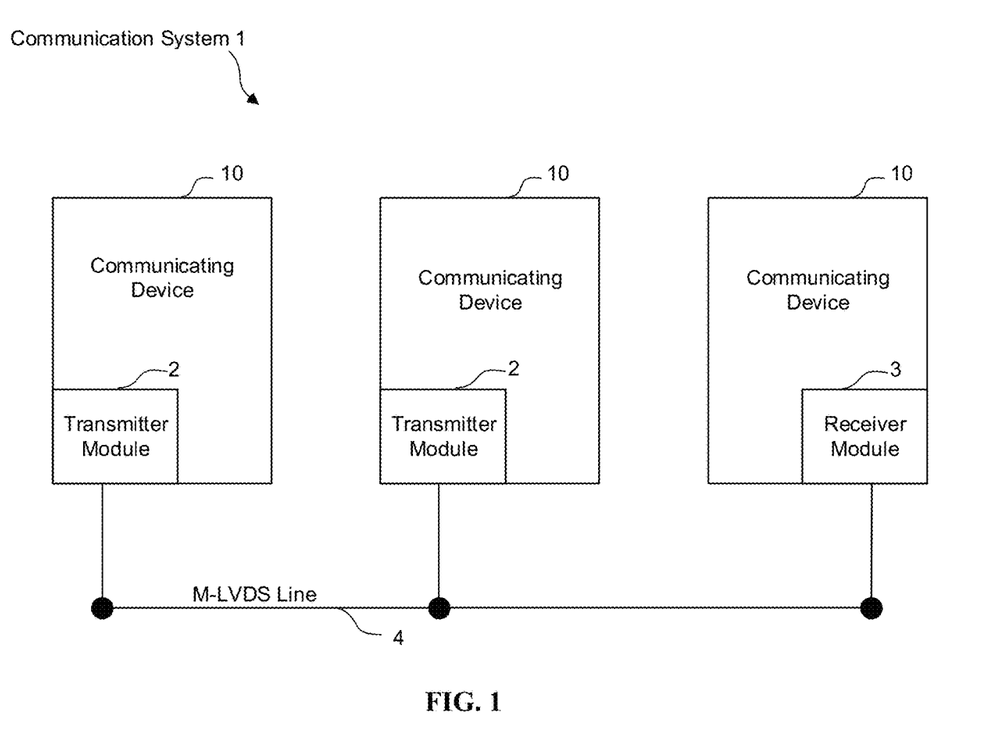
FIG. 1 illustrates an example of a communication system for exchanging Ethernet Medium Access Control, MAC, frames on a single Multipoint Low Voltage Differential Signaling, M-LVDS, line.

An example of a communication system 1 comprising a plurality of communicating devices 10 connected to a same M-LVDS line are illustrated in FIG. 1. A communicating device 10 may comprise a transmitter module 2. A communicating device 10 may comprise a receiver module 3. A communicating device 10 may comprise both a transmitter module 2 and a receiver module 3. In some examples, a communicating device 10 may be a programmable logic controller, PLC.

A transmitter module 2 should be understood in the present disclosure as an electronic unit implementing a physical layer, PHY layer, of the Open System Interconnection, OSI, model, and adapted for transmitting Ethernet MAC frames on a single M-LVDS line. The Ethernet MAC frames to be transmitted are received by the transmitter module 2 via a media-independent interface, MII, comprising parallel data lines and connecting the transmitter module 2 to a MAC layer of the OSI model.

A media-independent interface (MII) corresponds to a standard interface (IEEE 802.3) for exchanging data between a MAC layer and a PHY layer in the OSI model. The transmitter module 2 can exchange data with a MAC layer using one or several types of MII. In some examples, a type of MII comprises standard MII, gigabit media-independent interface, GMII, reduced media-independent interface, RMII, or reduced gigabit media-independent interface, RGMII.

A standard MII may generally comprise for the transmission seven lines between the MAC and the PHY layers. The seven lines comprise four data lines, each one transmitting data at 25 Mbits/s thereby providing a data rate of 100 Mbit/s, a clock line for transmitting a clock signal, an enable line for indicating when the data are transmitted and optionally an error line for indicating when an error occurs.

The GMII may comprise for the transmission eleven lines between the MAC and the PHY layers. The eleven lines comprise eight data lines, each one transmitting data at 125 Mbits/s thereby providing a data rate of 1 Gbit/s, a clock line for transmitting a clock signal, an enable line for indicating when the data are transmitted and optionally an error line for indicating when an error occurs.

The RMII may comprise for the transmission four lines between the MAC and the PHY layers. The four lines comprise two data lines, each one transmitting data at 50 Mbits/s thereby providing a data rate of 100 Mbit/s, a clock line for transmitting a clock signal and an enable line for indicating when the data are transmitted.

Hence, a transmitter module 2 according to the present disclosure is adapted to transmit the data received from the data lines and the clock signal received from the clock line and the data received from the enable and the error lines of the MII on a single M-LVDS line 4, i.e. on a single pair of electric wires carrying the differential M-LVDS signals. In particular, it is emphasized that the clock signal is not transmitted on a dedicated M-LVDS line in the present disclosure and is embedded and transmitted on the same M-LVDS line 4 as the data received from the data lines. Also, it is emphasized that the data received from all data lines (i.e. 4 for MII, 8 for GMII, etc.) is transmitted on the same M-LVDS line 4, i.e. on the same pair of electric wires, and not on separate M-LVDS lines.

It should be noted that a MII transmission exchanging data between MAC and PHY layers cannot be interrupted. Hence, once a transmission is started, a whole Ethernet MAC frame should be transmitted in one time. It is complicated, due to the functioning of the MII, to send an Ethernet MAC frame in several times by the MII.

A receiver module 3 should be understood in the present disclosure as an electronic unit implementing a PHY layer of the OSI model, adapted for receiving Ethernet MAC frames transmitted on a single M-LVDS line and adapted for transmitting such Ethernet frames to the MAC layer using a MII. The receiver module 3 of a communicating device 10 is adapted to receive Ethernet MAC frames transmitted by transmitter module 2 of another communicating device 10.

A communication system 1 comprising communicating devices 10, each communicating device 10 comprises at least one transmitter module 2 or one receiver module 3 according to the present disclosure thereby allows exchanging Ethernet MAC frames between the communicating devices 10 using a single M-LVDS line, i.e. a single pair of electric wires. With respect to communication systems of the prior art, the communication system 1 according to the present disclosure therefore reduces the power consumption of the different communicating devices 10 while reducing the space, the cost and the complexity of the communication system by removing M-LVDS lines.

Example of Transmitter Module

Figure 2:
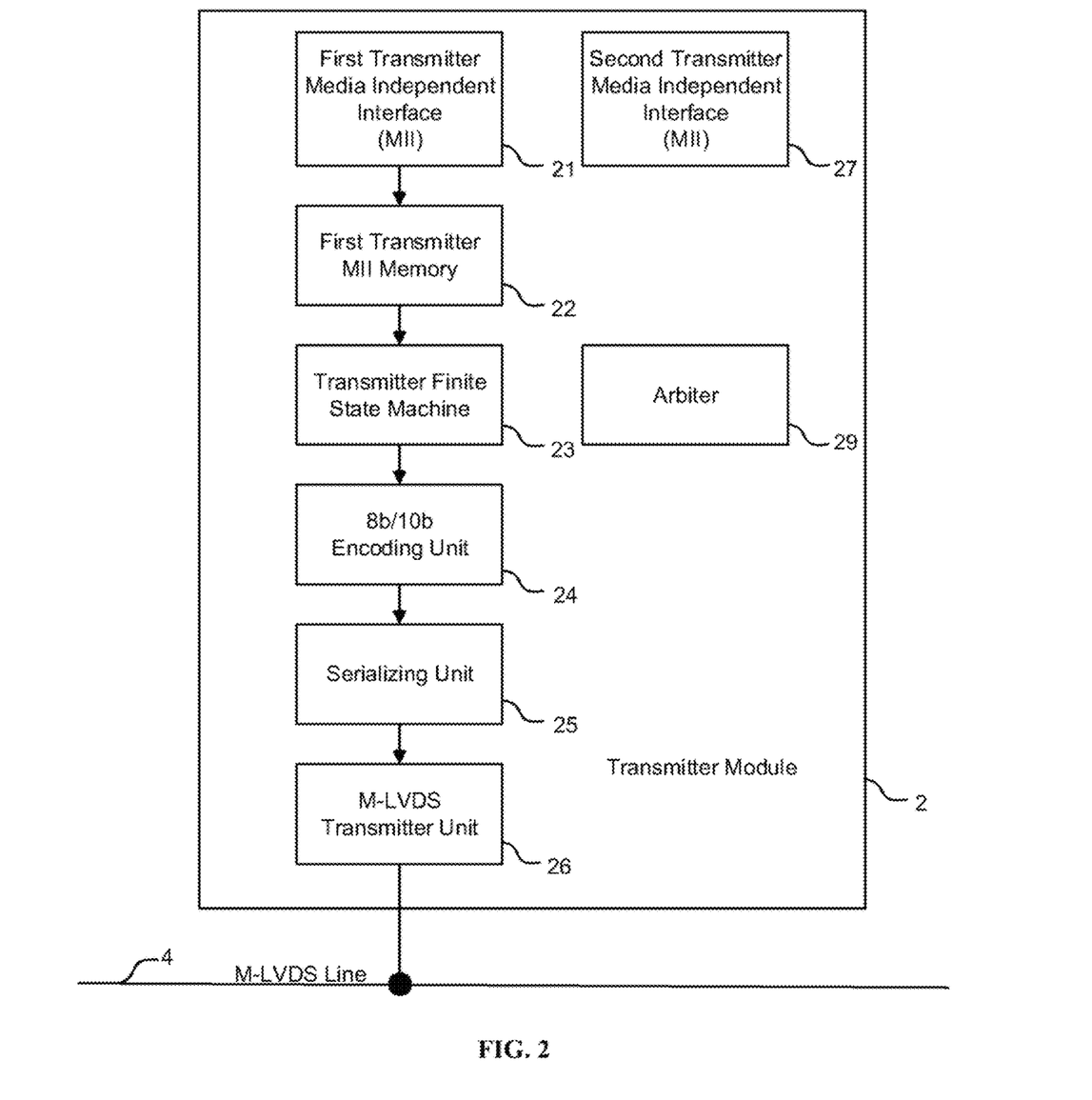
FIG. 2 illustrates a non-limitative example of a transmitter module for transmitting Ethernet MAC frames on a single M-LVDS line.

With reference to FIG. 2, it will be described below a non-limitative example of transmitter module 2 according to the present disclosure.

The example of transmitter module 2 comprises a first transmitter MII interface 21, a first transmitter MII memory 22, a transmitter finite state machine, FSM, 23, a 8b/10b encoding unit 24, a serializing unit 25 and a M-LVDS transmitter 26.

The first transmitter MII 21 comprises parallel data lines (TXDn) for receiving bits of an Ethernet MAC frame to be transmitted on the M-LVDS line, a clock line (TX_CLK) for exchanging a clock signal between the PHY and the MAC layers, an enable line (TX_EN) for indicating when the data are transmitted and, optionally, an error line (TX_ER) for indicating when an error occurs. The number of parallel data lines depends on the type of MII used. Types of MII have been presented above with their characteristics. The first transmitter MII 21 can correspond to any one of the types presented above.

The first transmitter MII 21 allows delimiting the Ethernet MAC frame based on the enable line (TX_EN). That is, the transmitter MII 21 is able to tag a bit corresponding to a beginning of an Ethernet MAC frame and to tag another bit corresponding to an end of the Ethernet MAC frame.

The first transmitter MII memory 22 corresponds to a memory for storing the data received from the first transmitter MII 21. The first transmitter MII memory 22 may be administrated as a first in, first out, FIFO memory. The first transmitter MII memory 22 allows compensating a difference between a clock associated to the transmission using MII and a clock associated to the transmitter module 2. The clock of the transmitter module 2 will be designated as transmitter clock hereinafter. Indeed, depending on the type of MII used, the clock and the data rate associated to the Ethernet MAC frame transmission between the MAC layer and the PHY layer will be different.

In some examples wherein the first transmitter MII corresponds to a standard MII, the first transmitter MII memory may be adapted to store a single Ethernet MAC frame.

The transmitter FSM 23 formats the Ethernet MAC frame to be transmitted on a single M-LVDS line 4. In particular, the transmitter FSM 23 sequentially provides 8-bit words of the Ethernet MAC frame received from the transmitter MII 21 to the 8b/10b encoding unit 24. The transmitter FSM reads the bits of the Ethernet MAC frame received by the parallel data line and forms the 8-bit words to be encoded by the 8b/10b encoding unit.

In some examples, the transmitter FSM 23 may monitor the transmitter MII memory 22 and, when the Ethernet MAC frame is stored in such transmitter MII memory 22, the transmitter FSM 23 sequentially sends the data of the Ethernet MAC frame to the 8b/10b encoding unit.

The transmitter FSM 23 also adds M-LVDS words to the Ethernet MAC frame received from the MII, thereby forming M-LVDS frame, such that the Ethernet MAC frame can be transmitted on the single M-LVDS line. A M-LVDS frame should be understood in the present disclosure as a frame comprising the Ethernet MAC frame received from the transmitter MII 21 and M-LVDS words allowing the Ethernet MAC frame to be recovered in a receiver module 3 after being sent in a single M-LVDS line. The M-LVDS words may comprise M-LVDS preamble words corresponding to the header of the M-LVDS frame. The M-LVDS words may also comprise M-LVDS ending words corresponding to the end of the M-LVDS frame.

Hence, the transmitter FSM 23 transmits to the 8b/10b encoding unit 8-bit words corresponding to M-LVDS 8-bit words and 8-bit words corresponding to the Ethernet MAC frame.

In some examples, the M-LVDS preamble words comprise a line word for setting the electrical level of the single M-LVDS line to a predetermined level. In some examples, all the bits of the line word are set at a same value, either 0 or 1.

In some examples, the M-LVDS preamble words comprise a clock synchronization word for recovering the transmitter clock in the receiver module 3. In some examples, a clock synchronization word may correspond to a word, in the M-LVDS frame, following a line word. Indeed, errors on the recovering of the transmitter clock at the receiver module 3 may be reduced by setting the line to a predetermined level before sending the clock synchronization word on the single M-LVDS line. In some examples, a clock synchronization word corresponds to a D10.2 character in the 8/10b encoding unit 24.

In some examples, the M-LVDS preamble words comprise a time synchronization word for recovering a beginning of a word of the M-LVDS frame. In some examples, a time synchronization word may correspond to a word, in the M-LVDS frame, following a clock synchronization word. Indeed, once the transmitter clock is recovered in the receiver module 3, the receiver module 3 should be able to identify the different words of the M-LVDS frame. In some examples, a clock synchronization word corresponds to a K28.5 symbol in the 8/10b encoding unit 24.

In some examples, the M-LVDS ending words comprise an ending word indicating the ending of the Ethernet MAC frame. In some examples, an ending word corresponds to a K28.4 symbol in the 8/10b encoding unit 24.

In some examples, the M-LVDS ending words comprise a line word for setting the M-LVDS line at a predetermined level after the transmission. In such examples, the line word, in the M-LVDS frame, may directly follow the ending word indicating the ending of the Ethernet MAC frame.

In some examples, the transmitter FSM 23 is configured to replace the first word of the Ethernet MAC preamble of the Ethernet MAC frame by a beginning word indicating the beginning of the Ethernet MAC frame. The first word of the Ethernet MAC preamble corresponds to the first word of the Ethernet MAC frame received by the transmitter MII 21. Hence, by replacing the first word of Ethernet preamble by a beginning word, the receiver module 3 is able to identify such beginning word and to identify the beginning of the Ethernet MAC frame. In some examples, the beginning word may correspond to a word, in the M-LVDS frame, following a time synchronization word. That is, the beginning of the Ethernet MAC frame may follow a time synchronization word in the M-LVDS frame. In some examples, a beginning word corresponds to a K28.3 symbol in the 8/10b encoding unit 24.

Figure 4:
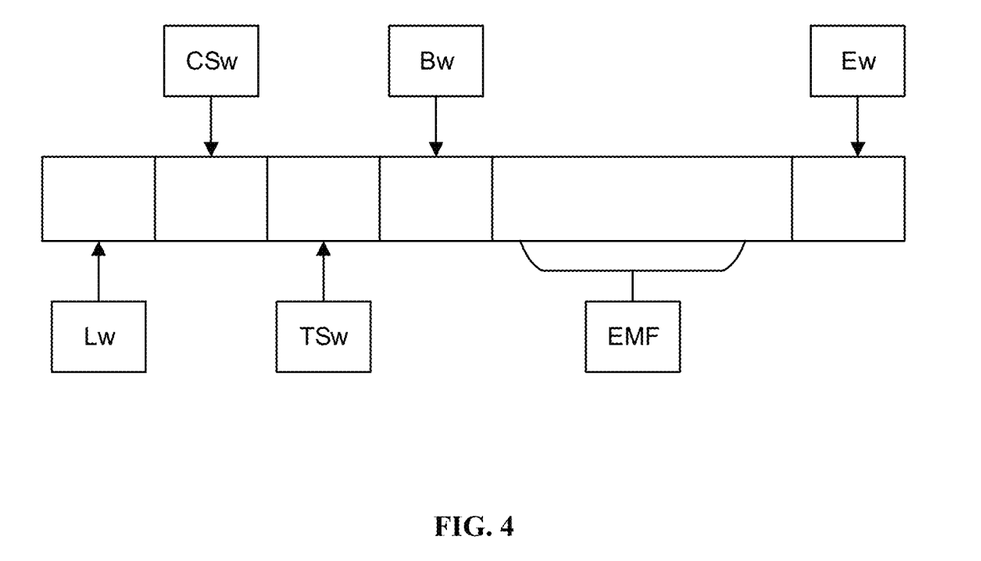
FIG. 4 illustrates a non-limitative example of M-LVDS frame.

With reference to FIG. 4, a non-limiting example of M-LVDS frame adapted to be transmitted on the single M-LVDS line 4 is illustrated. As explained above, the example of M-LVDS frame comprise a line word Lw to set the electrical level of the M-LVDS line to a predetermined level. The line word Lw is followed by a clock synchronization word CSw, such that a receiver module 3 may recover the clock of a transmitter module 2. Then, the clock synchronization word CSw is followed by a time synchronization word TSw which allows recovering a beginning of a word of the M-LVDS frame. The clock synchronization word CSw is followed by a beginning word Bw replacing a first word of the Ethernet MAC frame EMF. The beginning word allows a receiver module 3 to detect the beginning of the Ethernet MAC frame EMF. Following the Ethernet MAC frame EMF, the M-LVDS frame comprises an ending word allowing the receiver module to detect the end of the Ethernet MAC frame EMF.

Back to FIG. 2, the example of transmitter module 2 comprises a 8b/10b encoding unit 24 adapted to encode 8-bit words to produce 10-bit words. The 8-bit words comprises bits of the Ethernet MAC frame received on the parallel data lines of the first transmitter MII. The 8-bit words are sequentially sent by the transmitter FSM 23. The 8-bit words encoded by the 8b/10 unit may also comprise the M-LVDS preambles words.

In some examples, the encoding unit 24 comprises a known encoding table for matching 8-bit words to 10-bit words. In some other examples, a new encoding table may be built such that a predetermined plurality of successive bits to be transmitted on the M-LVDS line comprises a number of transitions greater than a predetermined threshold. In some alternative examples, the encoding table is built such that a predetermined plurality of successive bits to be transmitted comprises a number of identical values lower than another predetermined threshold. In some examples, the encoding table is built such that 5 successive bits of the M-LVDS frame comprises at least one transition or at most four identical values. Having an important number of transitions on the M-LVDS frame allows recovering the transmitter clock in the receiver module 3.

Hence, at an output of the encoding unit 24, the example of transmitter module 2 has produced the 10-bits words forming the M-LVDS frame to be transmitted, wherein the 10-bit words provide recurrent state changes which enable to implement clock recovery at the receiver side by using directly the 10-bit words. Hence, it is not necessary to use a dedicated M-LVDS line to transmit the clock signal since the clock information is embedded directly in the 10-bit words determined from the bits received on the data lines of the MII.

The example of transmitter module 2 then comprises a serializing unit 25 to serialize the M-LVDS frame comprising the 10-bits words. The serializing unit 25 sequentially provides bits of the words of the M-LVDS frames to a M-LVDS transmitter unit 26 at a desired speed in order to transmit the bits of the M-LVDS line.

The example of transmitter module 2 further comprises a M-LVDS transmitter unit 26 for transmitting the serialized 10-bit words of the M-LVDS frame on the M-LVDS line. The M-LVDS transmitter unit 26 applies a predetermined differential voltage on the M-LVDS line (i.e. pair of electric wires) depending on the value of the bits received from the serializing unit 25 at the transmitter clock of the transmitter module 2.

In some examples, the transmitter module 2 comprises a second transmitter MII 27 and an arbiter 29. The second transmitter MII 27 also comprises parallel data lines for receiving bits of another Ethernet MAC frame to be transmitted on the M-LVDS line. The arbiter 29 is adapted to choose which one of Ethernet MAC frames received by the first or by the second transmitter MII will be transmitted on the M-LVDS line. In some examples, the arbiter 29 comprises a priority value associated to each transmitter MII and the arbiter 29 is adapted to choose the Ethernet MAC frame to be transmitted based on such priority value.

In some examples, the first transmitter MII corresponds to a standard MII while the second transmitter MII 27 corresponds to a GMII. In such examples, the first transmitter MII comprises four data lines while the second transmitter MII 27 comprises eight data lines.

In some examples, the transmitter module 2 comprises a second transmitter MII memory (not shown) and the arbiter 29 is adapted to choose which one of the Ethernet MAC frames transmitted by the first or by the second transmitter MII will be transmitted on the M-LVDS line when arbiter 29 detects that both first and second transmitter memory stores an Ethernet MAC frame. The arbiter 29 may for example indicate to the transmitter FSM 23 the transmitter memory to be treated in priority.

In some examples, the transmitter FSM 23 is configured to add an error word on the M-LVDS frame when an underflow or an overflow occurs on a transmitter MII memory. In some examples, the error word corresponds to a K28.2 symbol in the 8/10b encoding unit 24.

Example of Receiver Module

Figure 3:
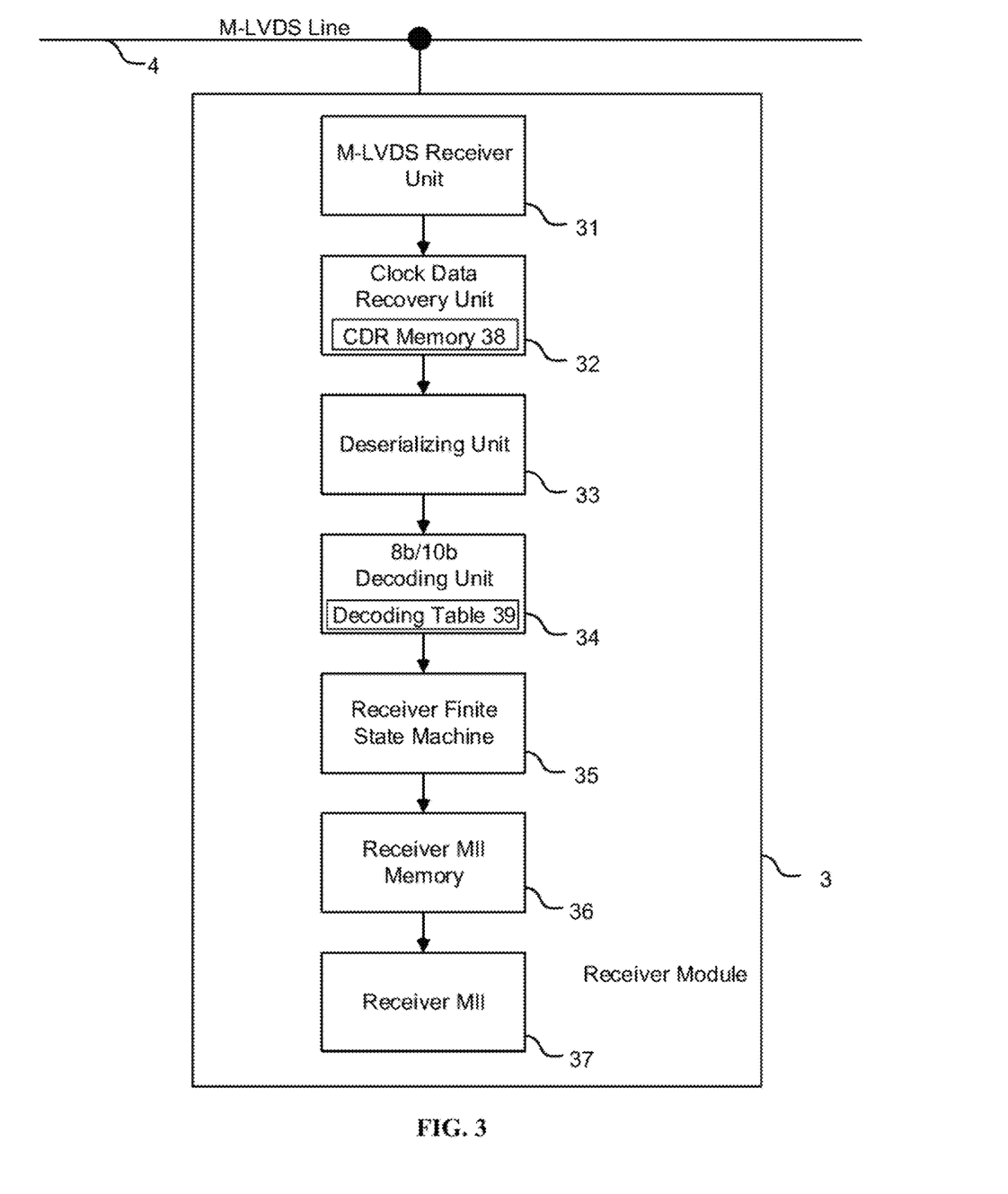
FIG. 3 illustrates a non-limitative example of a receiver module for receiving Ethernet MAC frames on a single M-LVDS line.

With reference to FIG. 3, it will be described below a non-limitative example of receiver module 3 according to the present disclosure. The receiver module 3 is adapted to work with a transmitter module 2 according to the present disclosure.

The example of receiver module 3 comprises a M-LVDS receiver unit 31, a clock data recovery, CDR, unit 32, a deserializing unit 33, a 8b/10b decoding unit 34, a receiver FSM 35, a receiver MII memory 36 and a receiver MII 37.

The receiver MII 37 comprises parallel data lines (RXDn) for transmitting bits of an Ethernet MAC frame received from the M-LVDS line to the MAC layer of the receiver module 3, a clock line (RX_CLK) for exchanging a clock signal, a data validation line (RX_DV) for indicating when the data are transmitted and an error line (RX_ER) for indicating when an error occurs. The number of parallel data lines depends on the type of MII used. The receiver MII 37 can correspond to any one of the types presented above.

The M-LVDS receiver unit 31 is adapted for receiving a serial bitstream on the single M-LVDS line 4.

The CDR unit 32 is adapted to recover the transmitter clock from the serial bitstream received by the M-LVDS receiver unit 31. In some examples, the CDR unit 32 is adapted to oversample the serial bitstream for recovering the transmitter clock of such serial bitstream. Hence, the CDR unit 32 is associated to a CDR clock adapted to work several times faster than the transmitter clock of the transmitter module 2.

In some examples, the transmitter clock is recovered based on a M-LVDS preamble word corresponding to a clock synchronization word. In such examples, the transmitter clock is recovered based on transitions comprised in the clock synchronization word.

The CDR unit 32 may comprise a CDR memory 38 comprising at least two bits of storage. The CDR unit 32 is adapted to store the bits extracted from the serial bitstream in the CDR memory 38. Such CDR memory 38 comprises at least two bits to compensate a few physical differences between the transmitter clock of the transmitter module 2 and a clock of the receiver module 3 (hereinafter designated as the receiver clock).

The extracted bits are then deserialized by the deserializing unit 33 to form 10-bit words. In some examples, the deserializing unit 33 may be adapted to detect a M-LVDS preamble word corresponding to a time synchronization word by monitoring the bits extracted by the CDR unit 32. The time synchronization word, once detected by the deserializing unit, allows the deserializing unit 33 to form the 10-bit words at the following of the time synchronization word.

The deserializing unit 33 acts in two different modes:
a searching mode wherein the deserializing unit 33 is searching for a time synchronization word by monitoring the bits extracted by the CDR unit 32, and
a transmission mode wherein the deserializing unit 33 forms and transmits 10-bit words to the 8b/10b decoding unit 34 after detecting the time synchronization word.

In the searching mode, the deserializing unit 33 does not form and transmit 10-bit words to the 8b/10b decoding unit 34 based on the bits extracted by the CDR unit 32. Indeed, such extracted bits do not correspond to a M-LVDS frame but correspond to random values read on the M-LVDS line by the CDR unit 32.

The 10 bit-words formed by the deserializing unit 33 are then transmitted to the 8b/10b decoding unit 34 to be decoded in order to produce 8-bit words. In some examples, the 8b/10b decoding unit comprises a decoding table 39 for matching 10-bit words to 8-bit words. The decoding table 39 of the 8b/10b decoding unit 34 is determined based on to the encoding table of the 8b/10b encoding unit 23.

In some examples, the 8b/10b decoding unit 34 is adapted to detect an error based on the 10-bit words. In some examples, an error may be detected by the decoding unit 34 when a 10-bit word is not associated to a 8-bit word in the decoding table 39. An error may also be detected when a predetermined plurality of successive bits belonging to two successive 10-bit words corresponds to a same value. As said above, 10-bit words produced by the 8b/10b encoding unit should preferably comprise transitions to recover the transmitter clock of the transmitter module 2. Hence, when a predetermined plurality of successive bits of two successive 10-bit words corresponds to a same value, an error can be detected.

In some examples, when an error is detected by the 8b/10b decoding unit 34, the 8b/10b decoding unit 34 is adapted to send an error signal to the deserializing unit 33. At reception of the error signal, the deserializing unit 33 may stop the transmission of the 10-bit words to the 8b/10b decoding unit 34 and may monitor the extracted bits to detect a synchronization word (i.e. may switch in the searching mode).

In some examples, when an error is detected by the 8b/10b decoding unit 34, the 8b/10b decoding unit 34 is adapted to send an error signal to the receiver MII 37 such that the receiver MII 37 can send an error signal using the error line (RX_ER).

The example of receiver module 3 may then comprise a receiver FSM 35 adapted to sequentially write, in the receiver MII memory 36, the Ethernet MAC frame received from the 8b/10b decoding unit.

The receiver FSM 35 is also adapted to determine an error based on successive 8-bit words. The receiver FSM 35 corresponds to a unit knowing the format of the M-LVDS frame. The receiver FSM 35 is thereby adapted to determine whether the successive 8-bit words correspond to the format of a M-LVDS frame. In some examples, the receiver FSM is adapted to determine whether the Ethernet MAC frame comprises a beginning word or an ending word. In some examples, the receiver FSM is adapted to detect whether the M-LVDS frame comprises an error word.

In some examples, when an error is detected by the receiver FSM 35, the receiver FSM 35 is adapted to send an error signal to the deserializing unit 33. At reception of the error signal, the deserializing unit 33 may stop the transmission of the 10-bit words to the 8b/10b decoding unit 34 and may monitor the extracted bits to detect a synchronization word.

In some examples, the receiver FSM 35 is also adapted to transmit an error signal to the receiver MII 37 such that the receiver MII 37 can send an error signal using the error line (RX_ER).

In some examples, the receiver FSM 35 is adapted to transmit an error signal to the receiver MII 37 and/or to the deserializing unit 33 when:
- the receiver FSM 35 detects an error word on the M-LVDS frame,
- the receiver FSM 35 detects an error in the format of the M-LVDS frame,
- the receiver FSM detects an underflow or an overflow on a receiver MII memory.

The receiver MII memory 36 corresponds to the memory storing the data to be sent to the MAC layer using the receiver MII 37. The receiver MII 37 comprises parallel data lines for outputting bits of the Ethernet MAC frame received from a transmitter module 2 on the M-LVDS line. The bits of the Ethernet MAC frame correspond to bits of the 8-bit words produced by the 8b/10b decoding unit.

In some examples, the bits stored in the receiver MII memory 36 are outputted to the MAC layer using the parallel data lines (RXDn) of the receiver MII 37 when the receiver MII memory 36 reaches a MII threshold. The MII threshold may depend on the type of MII used for the receiver MII.

In some examples wherein the receiver MII correspond to a standard MII, the receiver MII memory 36 may be adapted to store few bits, for example between 8 bits and 512 bits and preferably between 8 bits and 32 bits.

Indeed, the data rate of the standard MII (100 Mb/s), even by forming 10-bit word based on 8-bit words of the Ethernet MAC frame at the transmitter module 2 level which increases the data to be transmitted of 25% (125 Mb/s), is supported by the data rate of the M-LVDS (200 Mbits/s). Hence, the data rate of the M-LVDS allows a receiver module 3 and a transmitter module 2 exchanging an Ethernet MAC frame using standard MII to be synchronized such that the receiver module 3 can transmit the Ethernet MAC frame to its MAC layer without the need to store the whole Ethernet MAC frame. In such case, the transmitter module 2 and the receiver module 3 work almost at the same clock (the difference is due to the physical difference between the transmitter clock and the receiver clock). In other words, the receiver MII memory is depleting by the receiver MII as fast as being refilling by the data rate of transmission of the transmitter module 2 and can therefore comprise only few bits while avoiding the risk to interrupt the transmission of the Ethernet MAC frame to the MAC layer due to a miss of data in the receiver MII memory happening before the end of the transmission.

Indeed, it was explained above that, due to the functioning of the MII, a transmission of an Ethernet MAC frame cannot be transmitted in several times and should be transmitted in one time when using a MII. Hence, once an Ethernet MAC frame transmission using MII is started, said transmission cannot be interrupted. That is, most of the cases (for example GMII) require a receiver MII memory 36 having at least the capacity of storing a whole Ethernet MAC frame (around 2 kBytes) such that the transmission to the MAC layer using MII is enabled when the receiver MII memory already stored the whole Ethernet MAC layer.

In the example using standard MII, the latency of the transmission between the MAC layer of the transmitter module 2 and the MAC layer of the receiver module 3 is therefore reduced along with the size of the receiver MII memory since such receiver MII memory does not require storing the whole Ethernet MAC frame before transmitting such frame using the receiver MII.

In some examples, the receiver module 3 may comprise several receiver MII. The several receiver MII may have different types, for example a standard MII and a GMII. Each receiver MII may comprise its receiver MII memory associated. As explained above, when a receiver MII corresponds to a GMII, its associated receiver MII memory may be adapted to store a whole Ethernet MAC frame.

In some examples comprising several receiver MII, the receiver FSM 35 may determine to which receiver MII the Ethernet MAC frame is sent and transmit the 8-bits to the corresponding receiver MII memory.

A communication system 1 comprising communicating devices 10 which comprises at least one transmitter module 2 or one receiver module 3 according to the present disclosure thereby allows exchanging Ethernet MAC frames between the communicating devices 10 using a single M-LVDS line. With respect to communication systems of the prior art, the communication system 1 according to the present disclosure therefore reduces the power consumption of the different communicating devices 10 while reducing the space, the cost and the complexity of the communication system by removing M-LVDS lines.

Hence, the communication system 1 comprising communicating devices 10, each communicating device 10 comprises at least one example of transmitter module 2 or one example of receiver module 3 described above allows exchanging Ethernet MAC frame between the different communicating devices 10 using a single M-LVDS line.

The invention claimed is:

1. A transmitter module for transmitting Ethernet medium access control (MAC) frames on a single Multipoint Low Voltage Differential Signaling (M-LVDS) line, said transmitter module comprising:
   - a first transmitter media-independent interface (MII) comprising parallel data lines for receiving bits of an Ethernet MAC frame to be transmitted on the single M-LVDS line;
   - an 8b/10b encoding unit adapted to encode 8-bit words to produce 10-bit words, wherein the 8-bit words comprise the bits of the Ethernet MAC frame;
   - a serializing unit adapted to serialize the 10-bits words; and
   - an M-LVDS transmitter unit for transmitting the serialized 10-bit words on the single M-LVDS line.

2. The transmitter module according to claim 1, further comprising a transmitter finite state machine (FSM) for sequentially providing 8-bit words of the Ethernet MAC frame to the 8b/10b encoding unit, the transmitter FSM reading the bits of the Ethernet MAC frame and forming the 8-bit words of the Ethernet MAC frame.

3. The transmitter module according to claim 2, wherein the transmitter FSM is configured to add 8-bit M-LVDS preamble words to the Ethernet MAC frame and wherein the 8-bit M-LVDS preamble words comprise a clock synchronization word for recovering a clock of the transmitter module and a time synchronization word for recovering a beginning of a word of the Ethernet MAC frame.

4. The transmitter module according to claim 3, wherein the 8-bit M-LVDS preamble words further comprise a line word for setting an electrical level of the single M-LVDS line to a predetermined level.

5. The transmitter module according to claim 2, wherein the transmitter FSM is configured to replace the first word of an Ethernet MAC preamble of the Ethernet MAC frame by a word indicating the beginning of the Ethernet MAC frame.

6. The transmitter module according to claim 1 further comprising:
a second transmitter MII comprising parallel data lines for receiving bits of another Ethernet MAC frame to be transmitted on the single M-LVDS line; and
an arbiter adapted to choose which one of the Ethernet MAC frames transmitted by the first transmitter MII or by the second transmitter MII will be transmitted on the single M-LVDS line.

7. The transmitter module according to claim 6, wherein the first transmitter MII corresponds to a standard MII comprising four data lines and wherein the second transmitter MII corresponds to a gigabit MII comprising seven data lines.

8. A receiver module for receiving Ethernet Medium Access Control (MAC) frames on a single Multipoint Low Voltage Differential Signaling (M-LVDS) line, said receiver module comprising:
an M-LVDS receiver unit for receiving a serial bitstream on the single M-LVDS line, wherein the serial bitstream comprises 10-bit words of an 8b/10b encoding scheme;
a clock data recovery (CDR) unit adapted to recover a clock from the serial bitstream received by the M-LVDS receiver unit and to extract the bits from the serial bitstream based on the recovered clock;
a deserializing unit adapted to deserialize the extracted bits to form 10-bit words;
an 8b/10b decoding unit adapted to decode the 10-bit words formed by the deserializing unit to produce 8-bit words; and
a receiver media-independent interface (MII) comprising parallel data lines for outputting bits of an Ethernet MAC frame received on the single M-LVDS line, wherein the bits of the Ethernet MAC frame correspond to bits of the 8-bit words produced by the 8b/10b decoding unit.

9. The receiver module according to claim 8, wherein the CDR unit is adapted to oversample the serial bitstream for recovering the clock of said serial bitstream, and wherein the CDR unit comprises a CDR memory comprising at least two bits of storage and being adapted to store the bits extracted from the serial bitstream.

10. The receiver module according to claim 8, wherein the deserializing unit is adapted to monitor the extracted bits to detect a synchronization word and to transmit the formed 10-bit words following detection of said synchronization word to the 8b/10b decoding unit.

11. The receiver module according to claim 10, wherein the 8b/10b decoding unit comprises a decoding table for matching the 10-bit words formed by the deserializing unit to 8-bit words in the decoding table and wherein the 8b/10b decoding unit is adapted to detect an error based on the 10-bit words formed by the deserializing unit.

12. The receiver module according to claim 11, wherein the error is detected by the 8b/10b decoding unit when a 10-bit word of the 10-bit words formed by the deserializing unit is not associated to an 8-bit word in the decoding table or when a predetermined plurality of successive bits belonging to two successive 10-bit words of the 10-bit words formed by the deserializing unit corresponds to a same value.

13. The receiver module according to claim 8 further comprising a receiver finite state machine (FSM), wherein the receiver FSM is adapted to determine an error based on successive 8-bit words of the 8-bit words produced by the 8b/10b decoding unit.

14. The receiver module according to claim 13, wherein the 8b/10b decoding unit and the receiver FSM are adapted to send an error signal to the deserializing unit.

15. A communication system for exchanging Ethernet Medium Access Control (MAC) frames between a plurality of communicating devices connected to a same single Multipoint Low Voltage Differential Signaling (M-LVDS) line, the communication system comprising:
at least one communicating device of the plurality of communicating devices comprising a transmitter module for transmitting the Ethernet MAC frames on the single M-LVDS line, said transmitter module comprising:
a first transmitter media-independent interface (MII) comprising parallel data lines for receiving bits of an Ethernet MAC frame to be transmitted on the single M-LVDS line;
an 8b/10b encoding unit adapted to encode 8-bit words to produce 10-bit words, wherein the 8-bit words comprise the bits of the Ethernet MAC frame;
a serializing unit adapted to serialize the 10-bits words; and
an M-LVDS transmitter unit for transmitting the serialized 10-bit words on the single M-LVDS line, wherein the transmitter module is connected to the single M-LVDS line; and
at least one communicating device of the plurality of communicating devices comprising a receiver module for receiving the Ethernet MAC frames on the single M-LVDS line, said receiver module comprising:
an M-LVDS receiver unit for receiving a serial bitstream on the single M-LVDS line, wherein the serial bitstream comprises 10-bit words of an 8b/10b encoding scheme;
a clock data recovery (CDR) unit adapted to recover a clock from the serial bitstream received by the M-LVDS receiver unit and to extract the bits from the serial bitstream based on the recovered clock;
a deserializing unit adapted to deserialize the extracted bits to form 10-bit words;
an 8b/10b decoding unit adapted to decode the 10-bit words formed by the deserializing unit to produce 8-bit words; and
a receiver media-independent interface (MII) comprising parallel data lines for outputting bits of an Ethernet MAC frame received on the single M-LVDS line, wherein the bits of the Ethernet MAC frame received on the single M-LVDS line correspond to bits of the 8-bit words produced by the 8b/10b decoding unit, wherein the receiver module is connected to the single M-LVDS line.

* * * * *